United States Patent [19]

Kita

[11] 4,228,768
[45] Oct. 21, 1980

[54] AIR INDUCTION APPARATUS FOR USE WITH KARMAN VORTEX SHEDDING FLOW METER

[75] Inventor: Toru Kita, Yokohama, Japan

[73] Assignee: Nissan Motor Company, Limited, Yokohama, Japan

[21] Appl. No.: 924,681

[22] Filed: Jul. 14, 1978

[30] Foreign Application Priority Data

Jul. 25, 1977 [JP] Japan .................. 52-99302[U]

[51] Int. Cl.³ .................. F02B 3/00; G01F 1/32
[52] U.S. Cl. .................. 123/494; 73/861.22
[58] Field of Search ......... 123/32 ET, 32 EA, 119 D; 73/194 VS, 194 E, 116, 202, 198 DB

[56] References Cited

U.S. PATENT DOCUMENTS

| | | | |
|---|---|---|---|
| 2,119,927 | 6/1938 | Reid | 123/119 D |
| 3,722,275 | 3/1973 | Rodely et al. | 73/194 VS |
| 3,956,928 | 5/1976 | Barrera | 123/32 EJ |
| 3,965,730 | 6/1976 | Innes | 73/194 VS |
| 4,089,215 | 5/1978 | Chapin | 123/32 EJ |
| 4,122,712 | 10/1978 | Thomas, Jr. et al. | 73/194 VS |

FOREIGN PATENT DOCUMENTS 101487  4/1925 Austria .................. 123/119 DB

*Primary Examiner*—P. S. Lall

[57] ABSTRACT

A cylindrical vortex generator of a Karman shedding flow meter is set in an inlet tube of an air cleaner of a combustion engine. An air flow uniforming device such as a wire netting is disposed in the inlet tube at a position upstream of the vortex generator for producing in the inlet tube a turbulent but considerably uniformed air flow directed toward the vortex generator. A bypass means is arranged in the inlet tube to make a bypass flow of air directed toward the vortex generator when the combustion engine is under high speed operation.

12 Claims, 12 Drawing Figures

AIR INDUCTION APPARATUS FOR USE WITH KARMAN VORTEX SHEDDING FLOW METER

FIELD OF THE INVENTION

The present invention relates in general to an air induction apparatus for a combustion engine, and more particularly to such an air induction apparatus cooperating with a Karman vortex shedding flow meter.

BACKGROUND OF THE INVENTION

It is known to those skilled in the art that, under certain condition, a "Karman vortex street" is shed in the wake of bluff cylindrical bodies when a flow of air is perpendicular to the generators of the cylinder. The shedding of vortices occurs periodically first from one side of the body and then from the other in accordance with the velocity of the air flow. Thus, by counting the number of the vortices created by the body in a unit time, the flow rate of the fluid can be measured. One of the vortex shedding flow meters to which the above mentioned theory is practically applied is schematically shown in FIG. 1 which is attached herewith. The flow meter shown generally comprises a vortex shedding body 10 in the form of cylinder with a diametrically extending through hole 12, a sensing means 14 such as electrically heated platinum plate or wire disposed in the moddile of the through hole 12, and a control circuit 16. In operation, the sensing means 14 produces signal representing the numbers of vortices produced in the wake of the body 10 under flowing of the air in the direction of the arrow A. The control circuit 16 evaluates practically the amount of air by computing the signals issued from the sensing means 14 for controlling as a result of this evaluation utilization circuit.

In some of the modern combustion engine driven vehicles, the vortex shedding flow meter of the type mentioned above is used for measuring the amount of air entering the engine to control as a result of this measurement the amount of fuel metered to the engine. The vortex shedding body 10 of the meter is usually set in an inlet tube of an air cleaner of the engine. However, if the inlet tube is not sufficiently long, air flow rate distribution is irregularly changed inevitably as will be understood from FIG. 2, so that the flow rate of the air which flows in the vicinity of the vortex shedding body 10 is frequently changed. Furthermore, when the air flow rate is small and/or the flowing air forms laminar flow in the inlet tube, there appears a considerable difference in air flow rate between a portion near the inner surface of the inlet tube and near the center of the tube. These will cause that accurate air flow measurement is not made by the Karman vortex shedding flow meter.

One of measures for solving the above mentioned problem is to provide the inlet tube with an air flow uniforming device such as a wire netting at a position upstream of the vortex shedding body 10. With this device, a turbulent but considerably uniformed air flow is produced upon flowing of the air in the inlet tube. Experiments have revealed that the presence of the air flow uniforming device permits accurate measurement of the flow meter especially when the flow rate is low.

Thus, such induction apparatus as just mentioned can perform accurate control of air-fuel ratio of the air-fuel mixture when the engine is under low speed operation, such as, under idling condition. However, when a high speed operation of the engine where a big volume of air is necessary is required, the presence of the flow uniforming member causes a trouble in that a considerable resistance of air flow is produced causing drop of output power of the engine.

SUMMARY OF THE INVENTION

Accordingly, an essential object of the present invention is to provide an air induction apparatus of a combustion engine which is free from the above mentioned problem.

It is an object of the present invention to provide an air induction apparatus by which accurate measurement of air flow rate is achieved when the flow rate is relatively low and by which smooth feeding of air into the engine is achieved when big volume of air is required by the engine.

According to the present invention, there is provided an air induction apparatus having a tube through which air to be metered by a Karman vortex shedding flow meter passes, the air induction apparatus comprising: a vortex generator of the flow meter disposed in the tube for generating vortices in the air flow; an air flow uniforming member disposed in the tube upstream of the vortex generator for producing in the tube a turbulent but uniformed flow of air directed toward the vortex generator; and bypass means for making a bypass flow of air directed toward the vortex generator when air the amount of which exceeds a predetermined level is required to pass through the tube.

BRIEF DESCRIPTION OF THE DRAWINGS

Other objects and advantages of the present invention will become clear from the following description when taken in conjunction with the accompanying drawings, in which.

DESCRIPTION OF PREFERRED EMBODIMENTS

Figure 1:
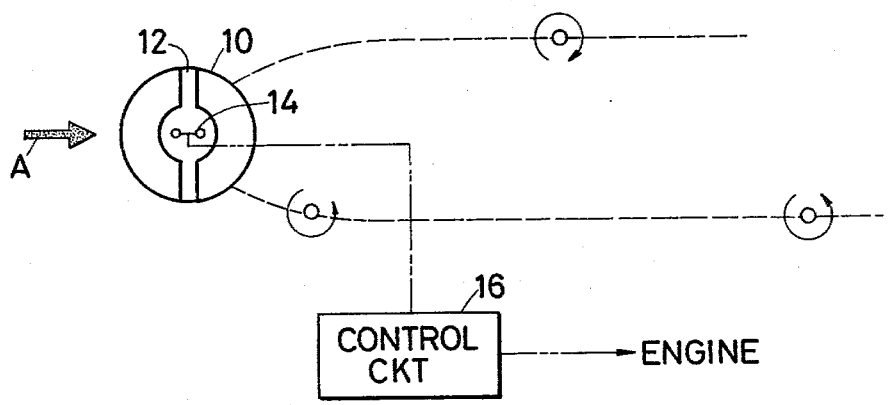
FIG. 1 is a diagrammatical view for explaining the principle of operation of the "Karman vortex shedding flow meter" used for measurement of flow rate of air.
Figure 2:
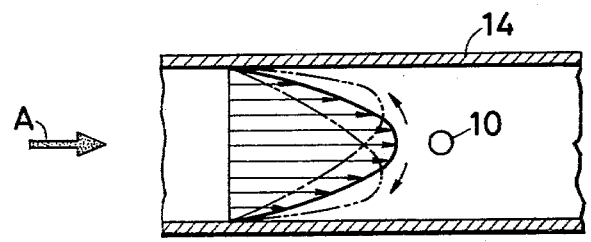
FIG. 2 is a schematical view for explaining the frequent change of air flow rate distribution which appears in an inlet tube of an air cleaner when no air flow uniforming device is arranged in the inlet tube.
Figure 3:
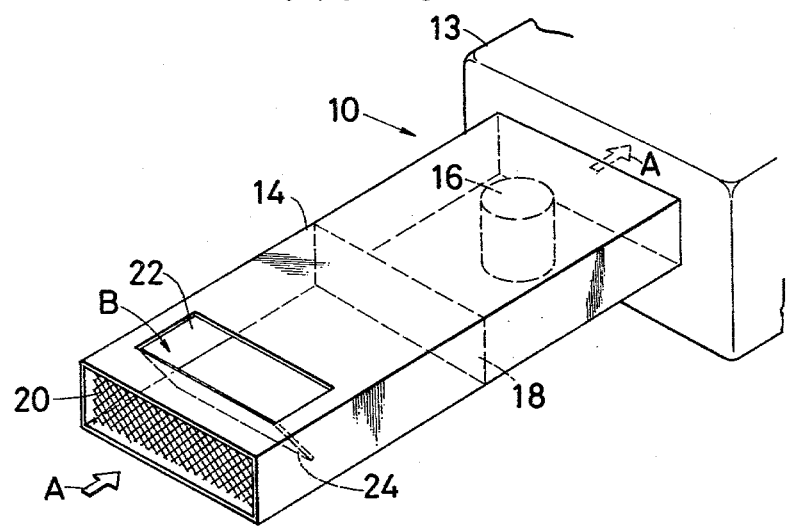
FIG. 3 is a schematical perspective view of an air induction apparatus for explaining the principle of the invention.

Referring to FIG. 3, there is schematically illustrated an air induction apparatus of the present invention, as being generally designated by numeral 10. The apparatus 10 shown comprises an air cleaner casing 13 in which a filter element (not shown) is disposed. Although not shown in the drawings, the air cleaner casing 13 is directly or indirectly connected to fuel supply means mounted on a combustion engine proper. An inlet tube or snorkel tube 14 is fixed to the air cleaner casing 13 in a conventional manner so that the ambient air is introduced into the tube 14 in the direction of arrows A, upon operation of the engine. Although the inlet tube 14 now shown has a form of rectangular prism, there is no limitation in form of the inlet tube of the invention. Denoted by numeral 16 is a vortex shedding body which has substantially the same form as the body 10 of FIG. 1 mentioned before. As shown, the body 16 is disposed in the inlet tube 14 in a manner to be perpendicular to the flow of air passing through the tube 14. A first net member or wire netting 18 having a mesh size less than 40 mesh (ASTM) is disposed in the inlet tube 14 at a position upstream of the vortex shedding body 16. Preferably, the net member 18 is arranged to be perpendicular to the air flow in the tube 14. A second net member or wire netting 20 is disposed in the most upstream portion of the inlet tube 14, preferably, in a manner to be perpendicular to the air flow in the tube 14. The second net member 20 has a mesh size finer than that of the first net member 18, for example greater than 40 mesh (ASTM).

The inlet tube 14 is formed with an opening 22 between the first and second net members 18 and 20, preferably near the second net member 20, as shown. A damper door 24 is hingedly mounted to the tube 14 so as to be swingable toward the interior of the inlet 14. The damper door 24 has size to seal the opening 22. As will be understood from the description which follows, a damper door operator cooperates with the damper door 24 in such a manner that when the amount of air flow is relatively small, the damper door 24 closes the opening 22 and when the amount of air exceeds a predetermined level, the damper door 24 opens the opening 22. Thus, when the combustion engine is under low speed operation, such as under idling condition, to necessitate a small amount of air, all the air to be fed into the engine passes the second net member 20. Under this, uniformed air flow is produced in the inlet tube 14, so that accurate measurement by the vortex shedding flow meter is achieved. While, when the engine is under high speed operation necessitating a big volume of air, a bypass passage for the air fed into the engine is provided by the damper door 24 with a result that the air feeding to the engine is smoothly made without affecting the output power of the engine. Furthermore, under such big volume flow, it is recognized that "Karman vortex sheet" is intensely shed minimizing the error of measurement made by the flow meter. The first net member 18 is used for trapping dust particles suspended in the air passing through the bypass opening 22.

Figure 4:
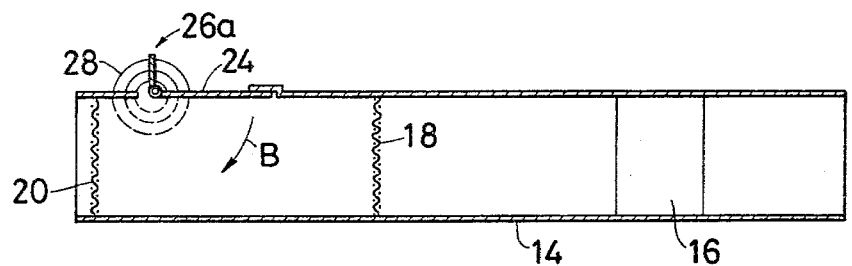
FIGS. 4, 5 and 6 are sectional views of first, second and third embodiments of the air induction apparatus of the present invention.

A first example of the damper door operator is shown in FIG. 4, as denoted by numeral 26a. The operator 26a comprises a spring 28 which is arranged to urge the damper door 24 in a direction to close the opening 22. Thus, when a magnitude of vacuum force in the inlet tube due to air flowing in the same exceeds the biasing force of the spring 28, the damper door 24 opens the opening 22 for the bypass feeding of the air.

Figure 5:
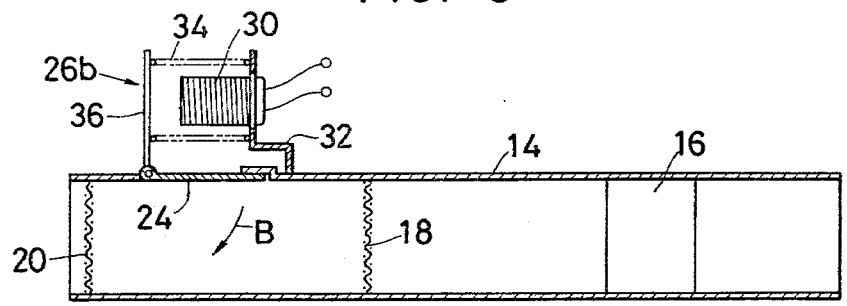

A second example of the damper door operator is shown in FIG. 5, as denoted by numeral 26b. The operator 26b comprises an electromagnet 30 supported on the inlet tube through a bracket 32, a spring 34 disposed about the electromagnet 30, and an arm 36 secured to the hinged portion of the damper door 24. Lead wires of the magnet 30 are connected to the vortex shedding flow meter. When the flow meter senses a condition in which big volume flow of air in the inlet tube 14 is required, it issues a signal to energize the electromagnetic 30 to attract the arm 36 against the biasing force of the spring 34 to open the opening 22.

Figure 6:
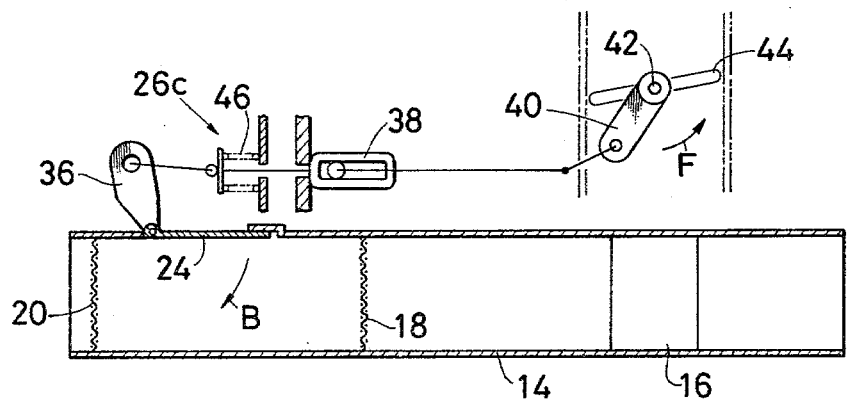

A third example of the damper door operator is shown in FIG. 6, as designated by numeral 26c. The operator 26c comprises a lost-motion linkage 38 connecting an arm secured to the shaft 42 of the throttle valve 44 to the arm 36, and a spring 46 arranged to urge the damper door 24 in a direction to close the opening 22. When the throttle valve 44 rotates in a direction of the arrow F and exceeds a predetermined open position for high output power of the engine, the lost-motion linkage 38 pulls the arm 36 rightwardly in this drawing moving the damper door 24 in the opening direction of arrow B.

Figure 7:
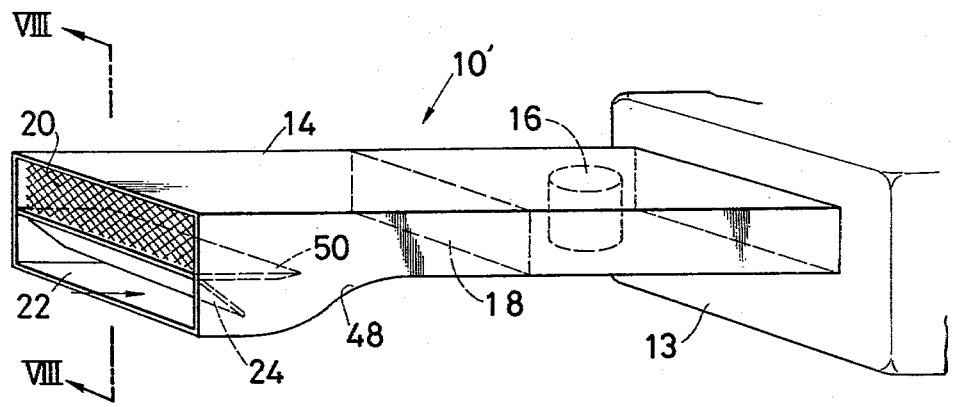
FIG. 7 is a schematical perspective view of fourth embodiment of the air induction apparatus of the invention.
Figure 8:
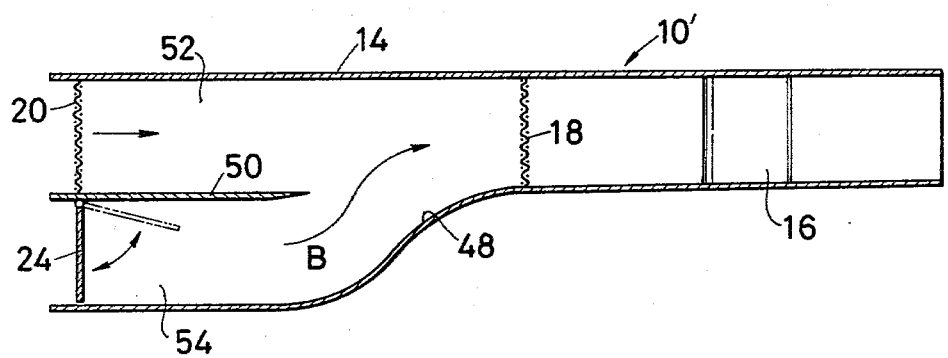
FIG. 8 is a sectional view taken on the line VIII—VIII of FIG. 7.

Referring to FIGS. 7 and 8, there is schematically illustrated another type air induction apparatus according to the invention, as generally designated by numeral 10'. For facilitation of drawing and description, substantially same parts will be designated by the same numerals as in the case of FIG. 3, the detailed explanation of which will be omitted from the following. In this embodiment, a slight change is made at the upstream portion of the inlet tube 14 of FIG. 3. As best seen from FIG. 8, the upstream portion of the inlet tube 14 is formed enlarged, leaving a smoothly curved inner wall surface 48 therein. A partition plate 50 is set in the upstream portion to divide the same into first and second sections 52 and 54. The plate 50 lies parallel with the longitudinal axis of the inlet tube 14. The second net member 20 is set in the upstream portion of the first section 52 and the damper door 24 is swingably set in the upstream portion of the second section 54. Any of the damper door operators (first, second and third examples shown in FIGS. 4, 5 and 6) can be used for operation of the damper door 24. With this arrangement, smooth feeding of big volume of air to the engine is achieved even when the engine is under high speed operation.

Figure 9:
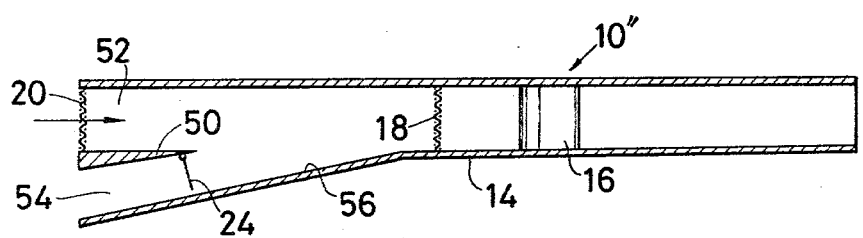
FIG. 9 is a sectional view of a fifth embodiment of the air induction apparatus of the invention.

A modification of the air induction apparatus of FIGS. 7 and 8 is shown in FIG. 9, as designated by numeral 10". In this modification, a flat but inclined surface 56 is formed instead of the smoothly curved inner wall surface 48 of FIGS. 7 and 8, and the damper door 24 is set at the downstream end of the partition plate 50. Furthermore, the partition plate 59 has a wedge-shaped cross section, as shown, to assure a reliable mixing of air in the first and second sections 52 and 54.

Figure 10:
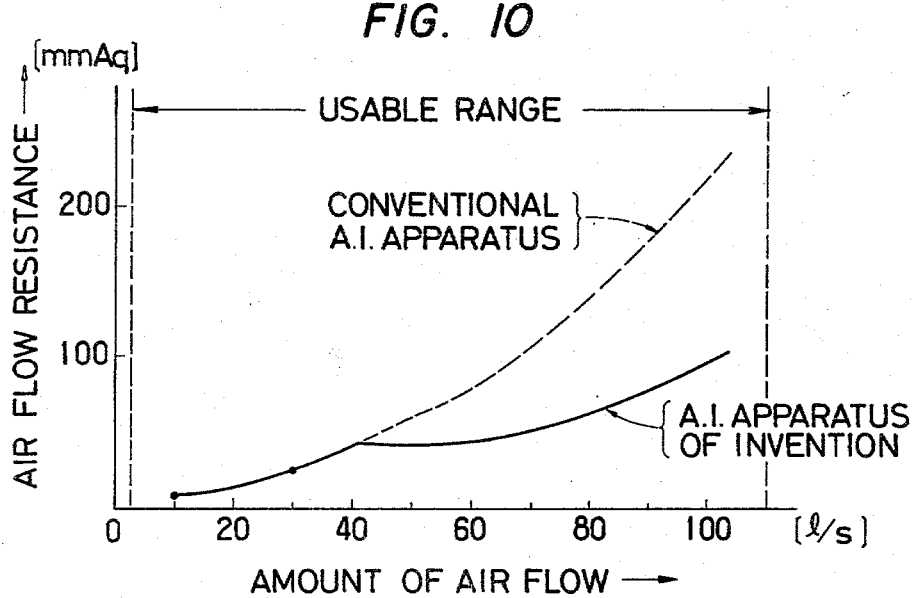
FIG. 10 is a graph showing reduction of air flow resistance upon high power requirement of the combustion engine, which is achieved by the air induction apparatus of the invention.

FIG. 10 is a graph showing the relationship between the amount of air passing through the inlet tube 14 and the air flow resistance appearing in the inlet tube 14, which is achieved by the air induction apparatus of the invention. For comparison, a conventional case without the above-mentioned air bypass means is carried on the graph with being represented by a broken line. As will be understood from this graph, the air induction apparatus of the invention shows a considerable reduction of air flow resistance at a higher range of the air flow amount.

Figure 11A:
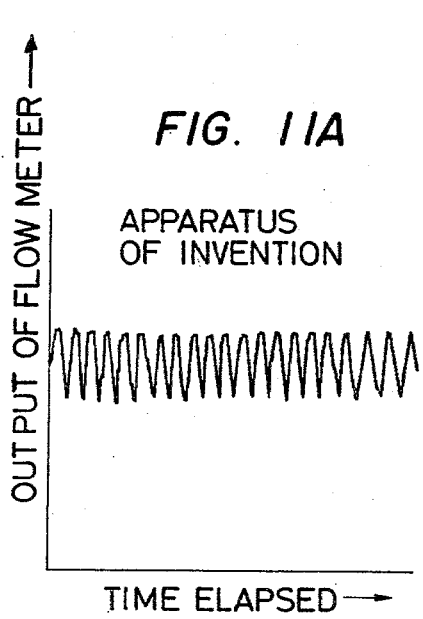
FIGS. 11A and 11B are sketches of waveforms explaining the results of vortex shedding flow meters which cooperate with the air induction apparatus of the invention and with a conventional air induction apparatus, respectively.
Figure 11B:
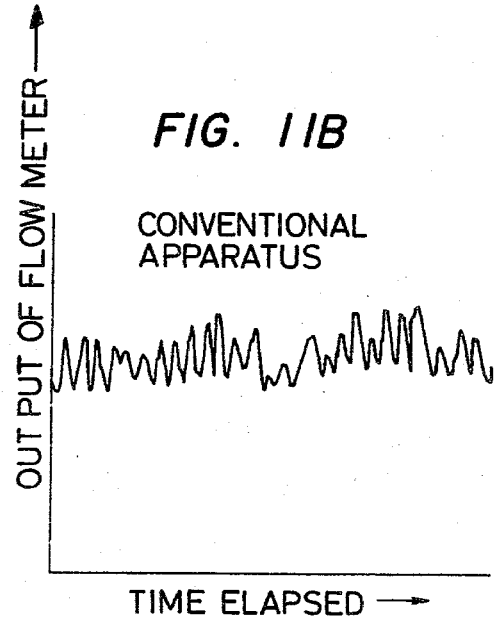

FIGS. 11A and 11B show respective waveforms explaining the results of vortex shedding flow meters which are cooperated with the air induction apparatus of the invention and the conventional induction apparatus which has no air flow uniforming device, under a condition where a relatively small amount of air passes through the inlet tube. As will be well understood from these graphs, the vortex shedding flow meter cooperating with the air induction apparatus of the invention produces quite stable waveforms.

Although in the previous description, it is explained that the vortex shedding body 16 is located in the inlet tube 14 of the air cleaner casing 13, it is also possible to locate such body in a connecting tube (not shown) located between the air cleaner casing and the fuel supply means of the combustion engine. In this case, the air flow uniforming device such as the first wire netting 18 should be also located in the connecting tube upstream of the vortex shedding body 16, but the second wire netting 20 is no more necessary.

From the foregoing description, it will be appreciated that according to the air induction apparatus of the invention, accurate measurement of air flow rate is achieved when the flow is relatively low and smooth feeding of air into the combustion engine is made when the engine is under high speed operation.

What is claimed is:

1. An air induction apparatus for feeding a combustion engine with air which is metered by using a Karman vortex shedding flow meter to control as a result of this meterage the amount of fuel fed to the engine, comprising:
   an inlet tube of an air cleaner which is arranged upstream of the engine proper;
   a cylindrical vortex generator of said flow meter, said generator being disposed in said inlet tube in a manner to be perpendicular to the longitudinal axis of said inlet tube;
   a first wire netting disposed in said inlet tube at a position upstream of said vortex generator in a manner to be perpendicular to the longitudinal axis of said inlet tube;
   a second wire netting disposed in said inlet tube at a position upstream of said first wire netting in a manner to be perpendicular to the longitudinal axis of said inlet tube, said second wire netting producing a turbulent but uniformed air flow directed toward said vortex generator upon flowing of the air in said inlet tube;
   means for defining an opening in said inlet tube at a position upstream of said first wire netting;
   a damper door swingably connected to said inlet tube to selectively open and close said opening; and
   damper door operator for operating said damper door in such a manner that under low speed operation of the engine, the damper door closes said opening, and under high speed operation of the engine, the damper door opens said opening.

2. An air induction apparatus as claimed in claim 1, in which said auxiliary opening is located downstream of said flow uniforming device but upstream of said generator.

3. An air induction apparatus as claimed in Claim 1, in which said damper door operator comprises:
   an arm secured to said damper door to move therewith;
   a lost motion linkage connecting said arm to an actuator of an actuator in such a manner that when an operation of said actuator exceeds a predetermined value, the arm is moved allowing said damper door to open and
   a spring arranged to bias said arm in a direction to allow said damper door to close said auxiliary opening.

4. An air induction apparatus as claimed in claim 1, in which said damper door operator comprises:
   an arm secured to said damper door to move therewith;
   an electromagnet mounted to said tube for attracting said arm in a direction to allow said damper door to open when electrically energized; and
   a spring disposed between said electromagnet and said arm to bias said arm in another direction to allow said damper door to close said auxiliary opening.

5. An air induction apparatus as claimed in claim 4, in which said electromagnet is energized when said Karman vortex shedding flow meter senses a condition wherein the flow rate of air passing through said tube exceeds a predetermined level.

6. An air induction apparatus as claimed in claim 1, in which said second wire netting has a mesh size finer than that of said first wire netting.

7. An air induction apparatus as claimed in claim 1, in which said auxiliary opening is located just below said air flow uniforming device leaving an enlarged section of said tube at a position upstream of said vortex generator.

8. An air induction apparatus as claimed in claim 7, in which an inner wall surface of said enlarged section which faces said auxiliary opening is smoothly curved so as to smoothly guide the air passing therethrough.

9. An air induction apparatus as claimed in Claim 7, further comprising a partition wall which is disposed in said enlarged section to divide the same into first and second sections, said first section being a section through which the air passing through said air uniforming device passes, said second section being a section through which the air passing through said auxiliary opening passes.

10. An air induction apparatus having a tube through which air to be metered by a Karman vortex shedding flow meter passes, said air induction apparatus comprising:
    a vortex generator of said flowmeter, said generator being disposed in said tube for generating vortexes in the air flow;
    an air flow uniforming device disposed in said tube upstream of said vortex generator for producing in the tube a turbulent but uniformed flow of air directed toward said vortex generator; and
    bypass means for making a bypass flow of air directed toward said vortex generator when increase in air flow rate in the tube is required, said bypass means comprising means defining an opening in said tube at a position upstream of said vortex generator, a damper door hingedly mounted to said tube so as to selectively open and close said opening, and damper door operator for operating said damper door in a manner that when an increased flow rate of air in the tube is required, said damper door opens, and when a decreased flow rate of air in tube is required, said damper door closes, said opening being located just below said air flow uniforming device leaving an enlarged section of said tube at a position upstream of said vortex generator.

11. An air induction apparatus as claimed in claim 10, in which an inner wall surface of said enlarged section which faces said opening of said means is smoothly curved so as to smoothly guide the air passing therethrough.

12. An air induction apparatus as claimed in claim 10, further comprising a partition wall which is disposed in said enlarged section to divide the same into first and second sections, said first section being a section through which the air coming from said air uniforming device passes, said second section being a section through which the air coming from said opening passes.

* * * * *